United States Patent [19]
Goode et al.

[11] Patent Number: 5,948,871
[45] Date of Patent: *Sep. 7, 1999

[54] METHOD FOR FEEDING A LIQUID CATALYST TO A FLUIDIZED BED POLYMERIZATION REACTOR

[75] Inventors: Mark Gregory Goode, Hurricane; Clark Curtis Williams, Charleston, both of W. Va.

[73] Assignee: Union Carbide Chemicals & Plastics Technology Corporation, Danbury, Conn.

[ * ] Notice: This patent is subject to a terminal disclaimer.

[21] Appl. No.: 08/864,769

[22] Filed: May 29, 1997

Related U.S. Application Data

[63] Continuation of application No. 08/659,764, Jun. 6, 1996, Pat. No. 5,693,727.

[51] Int. Cl.⁶ ...................................................... C08F 2/34
[52] U.S. Cl. .............................. 526/86; 526/88; 526/901; 526/943; 526/351
[58] Field of Search ................................. 526/86, 88, 351, 526/901

[56] References Cited

U.S. PATENT DOCUMENTS

| | | | |
|---|---|---|---|
| 4,665,143 | 5/1987 | Ahluwalia et al. | 526/88 |
| 4,767,735 | 8/1988 | Ewen et al. | 502/109 |
| 5,317,036 | 5/1994 | Brady, III et al. | 523/223 |

FOREIGN PATENT DOCUMENTS

| | | |
|---|---|---|
| 0549252 | 6/1993 | European Pat. Off. . |

*Primary Examiner*—David W. Wu
*Attorney, Agent, or Firm*—P. A. Doody

[57] ABSTRACT

For gas phase polymerization reactions in the presence of an unsupported polymerization catalyst, there is provided a process for introducing a liquid catalyst so as to provide a resin particle lean zone such that the average particle size of the resin produced ranges from about 0.01 to about 0.06 inches.

16 Claims, 1 Drawing Sheet

Figure 1. Profile of commercially available air cap mounted in custom adapter.

Figure 2. Extended tapered "air-cap" for catalyst spray nozzle.

Figure 3. Tapered injection tube tip.

Figure 4. Catalyst spray nozzle enclosed in purging shroud.

METHOD FOR FEEDING A LIQUID CATALYST TO A FLUIDIZED BED POLYMERIZATION REACTOR

This application is a Continuation of prior U.S. application Ser. No. 08/659,764 filed on Jun. 6, 1996, now U.S. Pat. No. 5,693,727.

FIELD OF THE INVENTION

This invention pertains to gas phase polymerization reaction in the presence of a liquid catalyst. More particularly, the present invention is directed to a method of feeding a liquid catalyst to a reactor so as to produce a particle lean zone in the reactor.

BACKGROUND OF THE INVENTION

Liquid catalysts offer many advantages over conventional solid-supported catalysts. Unsupported liquid catalysts require less equipment and raw materials to make them and impart fewer impurities to the final polymer product. The activity of a liquid catalyst is not adversely influenced by the surface area of a support material. Additional advantages are encountered when a high-activity unsupported metallocene catalyst is used for polymerizations in a fluidized bed reactor.

The use of liquid or unsupported catalysts are disclosed in U.S. Pat. No. 5,317,036. This patent is directed to the use of unsupported, soluble olefin polymerization catalysts, particularly metallocenes in liquid form, in gas phase reactions. These catalysts have a droplet size in the range of about 1 to about 1,000 microns.

However, when a liquid catalyst is employed in gas phase polymerization, several phenomena can occur. First, the soluble or liquid catalyst tends to deposit on the resin or polymer forming the fluidized bed which in turn leads to accelerated polymerization on the surface of the particles of the bed. As the coated resin particles increase in size, they are exposed to a higher fraction of catalyst solution or spray because of their increased cross-sectional dimensions. If too much catalyst is deposited on the polymer particles, they can grow so large that they cannot be fluidized thereby causing the reactor to be shut down.

Second, using liquid catalyst under conditions of high catalyst activity, e.g., a liquid metallocene catalyst, the initial polymerization rate is often so high that the newly formed polymer or resin particles can soften or melt, adhering to larger particles in the fluidized bed. This needs to be avoided or minimized to avert reactor shutdown.

On the other hand, if the polymer particles size is too small, entrainment can occur resulting in fouling of the recycle line, compressor, and cooler and increased static electricity leading to sheeting can result.

Accordingly, there is a need to control growth in polymer particle size when using a liquid catalyst in a gas phase fluidized polymerization process.

SUMMARY OF THE INVENTION

Surprisingly, the present invention provides a method for controlling growth in polymer particle size when using a liquid catalyst in gas phase fluidized polymerization. The present invention provides a process for producing a polymer in a gas fluidized bed reaction vessel having a polymerization zone containing a bed of growing polymer particles under polymerization conditions which comprises:

(i) continuously or intermittently introducing one or more monomers, optionally at least one diene, optionally at least one inert particulate material, and optionally one or more inert gases into the polymerization zone;

(ii) continuously or intermittently introducing into the reaction vessel an unsupported polymerization catalyst in liquid form without immediately contacting the bed of growing polymer particles so as to provide a particle lean zone;

(iii) continuously or intermittently withdrawing polymeric product from the reaction vessel; and (iv) continuously withdrawing unreacted monomers and gases from said polymerization and optionally compressing and cooling said gases while maintaining the temperature within the polymerization zone below the dew point of at least one monomer present in the polymerization zone.

DETAILED DESCRIPTION OF THE INVENTION

Polymers. Illustrative of the polymers which can be produced in accordance with the invention are the following: ethylene homopolymers and ethylene copolymers employing one or more $C_3$–$C_{12}$ alpha olefins; propylene homopolymers and propylene copolymers employing one or more $C_4$–$C_{12}$ alpha olefins; polyisoprene; polystyrene; polybutadiene; polymers of butadiene copolymerized with styrene; polymers of butadiene copolymerized with acrylonitrile; polymers of isobutylene copolymerized with isoprene; ethylene propylene rubbers and ethylene propylene diene rubbers; polychloroprene, and the like.

Polymerization. The present invention is not limited to any specific type of gas phase polymerization reaction and can be carried out in a stirred or fluidized bed reactor. The invention can be carried out in a single reactor or multiple reactors (two or more reactors in series). In addition to well known conventional gas phase polymerizations processes, "condensed mode", including the so-called "induced condensed mode", and "liquid monomer" operation of a gas phase polymerization can be employed.

A conventional fluidized bed process for producing resins is practiced by passing a gaseous stream containing one or more monomers continuously through a fluidized bed reactor under reactive conditions in the presence of a polymerization catalyst. Product is withdrawn from the reactor. A gaseous stream of unreacted monomer is withdrawn from the reactor continuously and recycled into the reactor along with make-up monomer added to the recycle stream.

Condensed mode polymerizations are disclosed in U.S. Pat. Nos. 4,543,399; 4,588,790; 5,352,749; and 5,462,999. Condensing mode processes are employed to achieve higher cooling capacities and, hence, higher reactor productivity. In these polymerizations a recycle stream, or a portion thereof, can be cooled to a temperature below the dew point in a fluidized bed polymerization process, resulting in condensing all or a portion of the recycle stream. The recycle stream is returned to the reactor. The dew point of the recycle stream can be increased by increasing the operating pressure of the reaction/recycle system and/or increasing the percentage of condensable fluids and decreasing the percentage of non-condensable gases in the recycle stream. The condensable fluid may be inert to the catalyst, reactants and the polymer product produced; it may also include monomers and comonomers. The condensing fluid can be introduced into the reaction/recycle system at any point in the system. Condensable fluids include saturated or unsaturated hydrocarbons. In addition condensable fluids of the polymerization process itself other condensable fluids, inert to the polymerization can be introduce to "induce" condensing mode operation. Examples of suitable condensable fluids may be selected from liquid saturated hydrocarbons containing 2 to 8 carbon atoms (e.g., propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons, and mixtures thereof). Condensable fluids may also include polymerizable condensable comonomers such as olefins, alpha-olefins, diolefins, diolefins containing at least one alpha olefin, and mixtures thereof. In condensing mode, it desirable that the liquid entering the fluidized bed be dispersed and vaporized quickly.

Liquid monomer polymerization mode is disclosed, in U.S. Pat. No. 5,453,471, U.S. Ser. No. 510,375, filed on Aug. 02, 1995, now U.S. Pat. No. 5,834,571 PCT 95/09826 (US) and PCT 95/09827 (US). When operating in the liquid monomer mode, liquid can be present throughout the entire polymer bed provided that the liquid monomer present in the bed is adsorbed on or absorbed in solid particulate matter present in the bed, such as polymer being produced or fluidization aids (e.g., carbon black) present in the bed, so long as there is no substantial amount of free liquid monomer present more than a short distance above the point of entry into the polymerization zone. Liquid mode makes it possible to produce polymers in a gas phase reactor using monomers having condensation temperatures much higher than the temperatures at which conventional polyolefins are produced. In general, liquid monomer process are conducted in a stirred bed or gas fluidized bed reaction vessel having a polymerization zone containing a bed of growing polymer particles. The process comprises continuously introducing a stream of one or more monomers and optionally one or more inert gases or liquids into the polymerization zone; continuously or intermittently introducing a polymerization catalyst into the polymerization zone; continuously or intermittently withdrawing polymer product from the polymerization zone; and continuously withdrawing unreacted gases from the zone; compressing and cooling the gases while maintaining the temperature within the zone below the dew point of at least one monomer present in the zone. If there is only one monomer present in the gas-liquid stream, there is also present at least one inert gas. Typically, the temperature within the zone and the velocity of gases passing through the zone are such that essentially no liquid is present in the polymerization zone that is not adsorbed on or absorbed in solid particulate matter.

Monomers. Monomers that can be employed in the process can include one or more $C_2$ to $C_{12}$ alpha-olefins; dienes such as those taught in U.S. Pat. No. 5,317,036 to Brady et al. such as hexadiene, dicyclopentadiene, norbornadiene, and ethylidene norbornene; readily condensable monomers such as those taught in U.S. Pat. No. 5,453,471 including isoprene, styrene, butadiene, isobutylene, and chloroprene, acrylonitrile, and the like.

Inert Particulate Materials. The process of the invention can optionally employ inert particulate materials as fluidization aids. These inert particulate materials can include carbon black, silica, talc, and clays, as well as inert polymeric materials. Carbon black has a primary particle size of about 10 to about 100 nanometers, an average size of aggregate of about 0.1 to about 10 microns, and a specific surface area of about 30 to about 1,500 $m^2$/gm. Silica has a primary particle size of about 5 to about 50 nanometers, an average size of aggregate of about 0.1 to about 10 microns, and a specific surface area of about 50 to 500 $m^2$/gm. Clay, talc, and polymeric materials have an average particle size of about 0.01 to about 10 microns and a specific surface area of about 3 to 30 $m^2$/gm. These inert particulate materials are employed in amounts ranging about 0.3 to about 80%, preferably about 5 to about 50%, based on the weight of the final product. They are especially useful for the polymerization of sticky polymers as disclosed in U.S. Pat. Nos. 4,994,534 and 5,304,588.

Chain Transfer Agents and Other Additives. Chain transfer agents, promoters, scavenging agents and other additives can be, and often are, employed in the polymerization process of the invention. Chain transfer agents are often used to control polymer molecular weight. Examples of these compounds are hydrogen and metal alkyls of the general formula $M^3R^5g$, where $M^3$ is a Group IA, IIA or IIIA metal, $R^5$ is an alkyl or aryl, and g is 1, 2, or 3. Preferably, a zinc alkyl is employed; and, of these, diethyl zinc is most preferred. Typical promoters include halogenated hydrocarbons such as $CHCl_3$, $CFCl_3$, $CH_3CCl_3$, $CF_2ClCCl_3$, and ethyltrichloroacetate. Such promoters are well known to those skilled in the art and are disclosed in, for example, U.S. Pat. No. 4,988,783. Other organometallic compounds such as scavenging agents for poisons may also be employed to increase catalyst activity. Examples of these compounds include metal alkyls, such as aluminum alkyls, most preferably triisobutylaluminum. Some compounds may be used to neutralize static in the fluidized-bed reactor, others known as drivers rather than antistatic agents, may consistently force the static to from positive to negative or from negative to positive. The use of these additives is well within the skill of those skilled in the art. These additives may be added to the reaction zone separately or independently from the liquid catalyst if they are solids, or as part of the catalyst provided they do not interfere with the desired atomization. To be part of the catalyst solution, the additives should be liquids or capable of being dissolved in the catalyst solution.

Catalyst. Any type of polymerization catalyst may be used in the present process, provided it is stable and sprayable or atomizable when in liquid form. A single liquid catalyst may be used, or a liquid mixture of catalysts may be employed if desired. These catalysts are used with cocatalysts and promoters well known in the art. Examples of suitable catalysts include:

A. Ziegler-Natta catalysts, including titanium based catalysts such as those described in U.S. Pat. Nos. 4,376,062 and 4,379,758. Ziegler-Natta catalysts are well known in the art, and typically are magnesium/titanium/electron donor complexes used in conjunction with an organoaluminum cocatalyst.

B. Chromium based catalysts such as those described in U.S. Pat. Nos. 3,709,853; 3,709,954; and 4,077,904.

C. Vanadium based catalysts such as vanadium oxychloride and vanadium acetylacetonate, such as described in U.S. Pat. No. 5,317,036.

D. Metallocene catalysts.

E. Cationic forms of metal halides, such as aluminum trihalides.

F. Cobalt catalysts and mixtures thereof such as those described in U.S. Pat. Nos. 4,472,559 and 4,182,814.

G. Nickel catalysts and mixtures thereof such as those described in U.S. Pat. Nos. 4,155,880 and 4,102,817.

H. Rare Earth metal catalysts, i.e., those containing a metal having an atomic number in the Periodic Table of 57 to 103, such as compounds of cerium, lanthanum, praseodymium, gadolinium and neodymium. Especially useful are carboxylates, alcoholates, acetylacetonates, halides (including ether and alcohol complexes of neodymium trichloride), and allyl derivatives of such metals. Neodymium compounds, particularly neodymium neodecanoate, octanoate, and versatate, are the most preferred rare earth metal catalysts. Rare earth catalysts are used to produce polymers polymerized using butadiene or isoprene.

Preferred among these different catalyst systems are catalyst compositions comprising a metallocene catalyst in liquid form and an activating cocatalyst. The practice of this invention is not limited to any particular class or kind of metallocene catalyst. Accordingly, the catalyst composition may comprise any unsupported metallocene catalyst useful in slurry, solution, bulk, or gas phase olefin polymerization. One or more than one metallocene catalyst may be employed. For example, as described in U.S. Pat. No. 4,530,914, at least two metallocene catalysts may be used in a single catalyst composition to achieve a broadened molecular weight distribution polymer product.

Metallocene catalysts are organometallic coordination complexes of one or more π-bonded moieties in association with a metal atom from Groups IIIB to VIII or the rare earth metals of the Periodic Table.

Bridged and unbridged mono-, bis-, and tris-cycloalkadienyl/metal compounds are the most common metallocene catalysts, and generally are of the formula:

(II)

wherein M is a metal from groups IIIB to VIII of the Periodic Table; L and L' are the same or different and are π-bonded ligands coordinated to M, preferably cycloalkadienyl groups such as cyclopentadienyl, indenyl, or fluorenyl groups optionally substituted with one or more hydrocarbyl groups containing 1 to 20 carbon atoms; $R^1$ is a $C_1$–$C_4$ substituted or unsubstituted alkylene radical, a dialkyl or diaryl germanium or silicon, or an alkyl or aryl phosphine or amine radical bridging L and L'; each X is independently hydrogen, an aryl, alkyl, alkenyl, alkylaryl, or arylalkyl radical having 1–20 carbon atoms, a hydrocarboxy radical having 1–20 carbon atoms, a halogen, $R^2CO_2$—, or $R^2{}_2NCO_2$—, wherein each $R^2$ is a hydrocarbyl group containing 1 to about 20 carbon atoms; n and m are each 0, 1, 2, 3, or 4; y is 0, 1, or 2; x is 1, 2, 3, or 4 depending upon the valence state of M; z is 0 or 1 and is 0 when y is 0; and x−y≧1.

Illustrative but non-limiting examples of metallocene catalysts represented by formula II are dialkyl metallocenes such as bis(cyclopentadienyl)titanium dimethyl, bis(cyclopentadienyl)titanium diphenyl, bis(cyclopentadienyl)zirconium dimethyl, bis(cyclopentadienyl)zirconium diphenyl, bis(cyclopentadienyl)hafnium methyl and diphenyl, bis(cyclopentadienyl)titanium di-neopentyl, bis(cyclopentadienyl)zirconium di-neopentyl, bis(cyclopentadienyl)titanium dibenzyl, bis(cyclopentadienyl)zirconium dibenzyl, bis(cyclopentadienyl)vanadium dimethyl; mono alkyl metallocenes such as bis(cyclopentadienyl)titanium methyl chloride, bis(cyclopentadienyl)titanium ethyl chloride, bis(cyclopentadienyl)titanium phenyl chloride, bis(cyclopentadienyl)zirconium methyl chloride, bis(cyclopentadienyl)zirconium ethyl chloride, bis(cyclopentadienyl)zirconium phenyl chloride, bis(cyclopentadienyl)titanium methyl bromide; trialkyl metallocenes such as cyclopentadienyl titanium trimethyl, cyclopentadienyl zirconium triphenyl, and cyclopentadienyl zirconium trineopentyl, cyclopentadienyl zirconium trimethyl, cyclopentadienyl hafnium triphenyl, cyclopentadienyl hafnium trineopentyl, and cyclopentadienyl hafnium trimethyl; monocyclopentadienyl titanocenes such as, pentamethylcyclopentadienyl titanium trichloride, pentaethylcyclopentadienyl titanium trichloride; bis(pentamethylcyclopentadienyl) titanium diphenyl, the carbene represented by the formula bis(cyclopentadienyl)titanium=$CH_2$ and derivatives of this reagent; substituted bis(cyclopentadienyl)titanium (IV) compounds such as: bis(indenyl)titanium diphenyl or dichloride, bis(methylcyclopentadienyl)titanium diphenyl or dihalide; dialkyl, trialkyl, tetraalkyl and pentaalkyl cyclopentadienyl titanium compounds such as bis(1,2-dimethylcyclopentadienyl)titanium diphenyl or dichloride, bis(1,2-diethylcyclopentadienyl)titanium diphenyl or dichloride; silicon, phosphine, amine or carbon bridged cyclopentadiene complexes, such as dimethyl silyldicyclopentadienyl titanium diphenyl or dichloride, methyl phosphine dicyclopentadienyl titanium diphenyl or dichloride, methylenedicyclopentadienyl titanium diphenyl or dichloride and other dihalide complexes, and the like; as well as bridged metallocene compounds such as isopropyl(cyclopentadienyl)(fluorenyl)zirconium dichloride, isopropyl(cyclopentadienyl)(octahydrofluorenyl)zirconium dichloride, diphenylmethylene(cyclopentadienyl)(fluorenyl) zirconium dichloride, diisopropylmethylene(cyclopentadienyl)(fluorenyl)-zirconium dichloride, diisobutylmethylene(cyclopentadienyl)(fluorenyl) zirconium dichloride, ditertbutylmethylene (cyclopentadienyl)-(fluorenyl)zirconium dichloride, cyclohexylidene(cyclopentadienyl)-(fluorenyl)zirconium dichloride, diisopropylmethylene (2,5-dimethylcyclopentadienyl)(fluorenyl)zirconium dichloride, isopropyl(cyclopentadienyl)(fluorenyl)hafnium dichloride, diphenylmethylene(cyclopentadienyl)(fluorenyl)hafnium dichloride, diisopropylmethylene(cyclopentadienyl)(fluorenyl)hafnium dichloride, diisobutylmethylene(cyclopentadienyl)(fluorenyl)hafnium dichloride, ditertbutylmethylene(cyclopentadienyl)(fluorenyl)hafnium dichloride, cyclohexylidene(cyclopentadienyl)(fluorenyl)hafnium dichloride, diisopropylmethylene(2,5-dimethylcyclopentadienyl) (fluorenyl)-hafnium dichloride, isopropyl(cyclopentadienyl)(fluorenyl)titanium dichloride, diphenylmethylene(cyclopentadienyl)(fluorenyl)titanium dichloride, diisopropylmethylene(cyclopentadienyl) (fluorenyl)titanium dichloride, diisobutylmethylene (cyclopentadienyl)(fluorenyl)titanium dichloride, ditertbutylmethylene(cyclopentadienyl)(fluorenyl)titanium dichloride, cyclohexylidene(cyclopentadienyl)(fluorenyl) titanium dichloride, diisopropylmethylene(2,5 dimethylcyclopentadienyl fluorenyl)titanium dichloride, racemic-ethylene bis (1-indenyl) zirconium (IV) dichloride, racemic-ethylene bis (4,5,6,7-tetrahydro-1-indenyl) zirconium (IV) dichloride, racemic-dimethylsilyl bis (1-indenyl) zirconium (IV) dichloride, racemic-dimethylsilyl bis (4,5,6,7-tetrahydro-1-indenyl) zirconium (IV) dichloride, racemic-1, 1,2,2-tetranmethylsilanylene bis (1-indenyl) zirconium (IV) dichloride, racemic-1,1,2,2-tetramethylsilanylene bis (4,5,6, 7-tetrahydro-1-indenyl) zirconium (IV) dichloride, ethylidene (1-indenyl tetramethylcyclopentadienyl) zirconium (IV) dichloride, racemicdimethylsilyl bis (2-methyl-4-t-butyl-1-cyclopentadienyl) zirconium (IV) dichloride, racemic-ethylene bis (1-indenyl) hafnium (IV) dichloride, racemic-ethylene bis (4,5,6,7-tetrahydro-1-indenyl) hafnium (IV) dichloride, racernic-dimethylsilyl bis (1-indenyl) hafnium (IV) dichloride, racemic-dimethylsilyl bis (4,5,6,7-tetrahydro-1-indenyl) hafnium (IV) dichloride, racemic-1,1,2,2-tetramethyisilanylene bis (1-indenyl) haffiium (IV) dichloride, racemic-1,1,2,2-tetramethylsilanylene bis (4,5,6,7-tetrahydro-1-indenyl) haffiium (IV), dichloride, ethylidene (1-indenyl-2,3,4,5-tetramethyl-1-cyclopentadienyl) hafnium (IV) dichloride, racemic-ethylene bis (1-indenyl) titanium (IV) dichloride, racemic-ethylene bis (4,5,6,7-tetrahydro-1-indenyl) titanium (IV) dichloride, racemic-dimethylsilyl bis (1-indenyl) titanium (IV) dichloride, racemic-dimethylsilyl bis (4,5,6,7-tetrahydro-1-indenyl) titanium (IV) dichloride, racemic-1,1,2,2-tetramethylsilanylene bis (1-indenyl) titanium (IV) dichloride racemic-1,1,2,2-tetramethylsilanylene bis (4,5,6,7-tetrahydro-1-indenyl) titanium (IV) dichloride, and ethylidene (1-indenyl-2,3,4,5-tetramethyl-1-cyclopentadienyl) titanium IV) dichloride.

Particularly preferred metallocene catalysts have one of the following formulas (III or IV):

(III)

or (IV)

wherein:

M is a metal from groups IIIB to VIII, preferably Zr or Hf;

L is a substituted or unsubstituted, $\pi$-bonded ligand coordinated to M, preferably a substituted cycloalkadienyl ligand;

each Q is independently selected from the group consisting of —O—, —NR$^3$—, —CR$^3{}_2$— and —S—, preferably oxygen;

Y is either C or S, preferably carbon;

Z is selected from the group consisting of —OR$^3$, —NR$^3{}_2$, —CR$^3{}_3$, —SR$^3$, —SiR$^3{}_3$, —PR$^3{}_2$, and —H, with the proviso that when Q is —NR$^3$— then Z is selected from the group consisting of —OR$^3$, —NR$^3{}_2$, —SR$^3$, —SiR$^3{}_3$, —PR$^3{}_2$, and —H, preferably Z is selected from the group consisting of —OR$^3$, —CR$^3{}_3$, and —NR$^3{}_2$;

n is 1 or 2;

A is a univalent anionic group when n is 2 or A is a divalent anionic group when n is 1, preferably A is a carbamate, carboxylate or other heteroallyl moiety described by Q, Y and Z combination; and each R$^3$ is independently a group containing carbon, silicon, nitrogen, oxygen, and/or phosphorus and one or more R$^3$ groups may be attached to the L substituent, preferably R$^3$ is a hydrocarbon group containing from 1 to 20 carbon atoms, most preferably an alkyl, cycloalkyl or an aryl group;

T is a bridging group selected from the group consisting of alkylene or arylene groups containing from 1 to 10 carbon atoms optionally substituted with carbon or heteroatoms, germanium, silicone and alkyl phosphine; and m is 1 to 7, preferably 2 to 6, most preferably 2 or 3.

The supportive substituent formed by Q, Y and Z is a unicharged polydentate ligand exerting electronic effects due to its high polarizability, similar to the cyclopentadienyl group. In the most preferred embodiments of this invention, the disubstituted carbamates, and the carboxylates are employed.

Examples of metallocene catalysts according to formulas III and IV include indenyl zirconium tris(diethylcarbamate), indenyl zirconium tris(pivalate), indenyl zirconium tris(p-toluate), indenyl zirconium tris(benzoate), (1-methylindenyl) zirconium tris(pivalate), (2-methylindenyl) zirconium tris(diethylcarbamate), (methylcyclopentadienyl) zirconium tris(pivalate), cyclopentadienyl tris(pivalate), and (pentamethylcyclopentadienyl) zirconium tris(benzoate). Preferred examples of these metallocene catalysts are indenyl zirconium tris(diethylcarbamate) and indenyl zirconium tris(pivalate).

Another type of metallocene catalyst that can be used in accordance with the invention is a constrained geometry catalyst of the formula:

(V)

wherein:

M is a metal of Group IIIB to VIII of the Periodic Table of the Elements:

Cp is a cyclopentadienyl or substituted cyclopentadienyl group bound in an $\eta^5$ bonded mode to M;

Z' is a moiety comprising boron, or a member of Group IVB of the Periodic Table of the Elements and optionally sulfur or oxygen, the moiety having up to 20 non-hydrogen atoms, and optionally Cp and Z' together form a fused ring system;

X'is an anionic ligand group or a neutral Lewis base ligand group having up to 30 non-hydrogen atoms;

a is 0, 1, 2, 3 or 4 depending on the valance of M; and

Y' is an anionic or non-anionic ligand group bonded to Z' and M comprising is nitrogen, phosphorus, oxygen or sulfur having up to 20 non-hydrogen atoms, and optionally Y' and Z' together form a fused ring system.

Constrained geometry catalysts are well known to those skilled in the art and are disclosed in, for example, U.S. Pat. Nos. 5,026,798 and 5,055,438 and published European Application No. 0 416 815 A2.

Illustrative but non-limiting examples of substituents Z', Cp, Y, X' and M in formula V are:

| Z' | Cp | Y' | X' | M |
|---|---|---|---|---|
| dimethyl-silyl | cyclopenta-dienyl | t-butylamido | chloride | titanium |
| methyl-phenylsilyl | fluorenyl | phenylamido | methyl | zirconium |
| diphenyl-silyl | indenyl | cyclohexylamido | | hafnium |
| tetramethyl-ethylene | | oxo | | |
| ethylene | tetramethyl-cyclopenta-dienyl | | | |
| diphenyl-methylene | | | | |

The activating cocatalyst is capable of activating the metallocene catalyst. Preferably, the activating cocatalyst is one of the following: (a) branched or cyclic oligomeric poly(hydrocarbyl-aluminum oxide)s which contain repeating units of the general formula —(Al(R*)O)—, where R* is hydrogen, an alkyl radical containing from 1 to about 12 carbon atoms, or an aryl radical such as a substituted or unsubstituted phenyl or naphthyl group; (b) ionic salts of the general formula [A⁺][BR₄⁻], where A⁺ is a cationic Lewis or Bronsted acid capable of abstracting an alkyl, halogen, or hydrogen from the metallocene catalysts, B is boron, and R is a substituted aromatic hydrocarbon, preferably a perfluorophenyl radical; and (c) boron alkyls of the general formula BR₃, where R is as defined above.

Preferably, the activating cocatalyst is an aluminoxane such as methylaluminoxane (MAO) or modified methylaluminoxane (MMAO), or a boron alkyl. Aluminoxanes are preferred and their method of preparation is well known in the art. Aluminoxanes may be in the form of oligomeric linear alkyl aluminoxanes represented by the formula:

or oligomeric cyclic alkyl aluminoxanes of the formula:

wherein S is 1–40, preferably 10–20; p is 3–40, preferably 3–20; and R* is an alkyl group containing 1 to 12 carbon atoms, preferably methyl or an aryl radical such as a substituted or unsubstituted phenyl or naphthyl radical. In the case of MAO, R* is methyl, whereas in MMAO, R* is a mixture of methyl and C2 to C12 alkyl groups wherein methyl comprises about 20 to 80 percent by weight of the R* group.

The amount of activating cocatalyst and metallocene catalyst usefully employed in preparation of the catalyst composition, whether the catalyst composition is formed in situ as it is being introduced into the reaction zone or formed prior to introduction into the reaction zone, can vary over a wide range. When the cocatalyst is a branched or cyclic oligomeric poly(hydrocarbylaluminum oxide), the mole ratio of aluminum atoms contained in the poly (hydrocarbylaluminum oxide) to metal atoms contained in the metallocene catalyst is generally in the range of from about 2:1 to about 100,000:1, preferably in the range of from about 10:1 to about 10,000:1, and most preferably in the range of from about 50:1 to about 2,000:1. When the cocatalyst is anionic salt of the formula [A⁺][BR*₄⁻] or a boron alkyl of the formula BR*₃, the mole ratio of boron atoms contained in the ionic salt or the boron alkyl to metal atoms contained in the metallocene catalyst is generally in the range of from about 0.5:1 to about 10:1, preferably in the range of from about 1:1 to about 5:1.

The liquid catalyst can be composed of one or more of metal compounds in combination with one or more co-catalysts. Alternatively, all or a portion of the co-catalyst can be fed separately from the metal compound(s) to the reactor. Promoters associated with any particularly polymerization are usually added to the reactor separately from the co-catalyst and/or metal compound(s).

If the metal compound and/or the co-catalyst occurs naturally in liquid form, it can be introduced "neat" into the particle lean zone. More likely, the liquid catalyst is introduced into the particle lean zone as a solution (single phase, or "true solution" using a solvent to dissolve the metal compound and/or co-catalyst), an emulsion (partially dissolving the catalyst components in a solvent), suspension, dispersion, or slurry (each having at least two phases). Preferably, the liquid catalyst employed is a solution or an emulsion, most preferably a solution. As used herein, "liquid catalyst" or "liquid form" includes neat, solution, emulsion, and dispersions of the transition metal or rare earth metal component(s) of the catalyst and/or co-catalyst.

The solvents that which can be utilized to form solutions of the soluble, unsupported transition metal and/or rare earth metal polymerization catalyst compounds are inert solvents, preferably non-functional hydrocarbon solvents, and may include aliphatic hydrocarbons such as butane, isobutane, ethane, propane, pentane, isopentane, hexane, heptane, octane, decane, dodecane, hexadecane, octadecane, and the like; alicyclic hydrocarbons such as cyclopentane, methylcyclopentane, cyclohexane, cyclooctane, norbornane, ethylcyclohexane and the like; aromatic hydrocarbons such as benzene, toluene, ethylbenzene, propylbenzene, butylbenzene, xylene, tetrahydrofuran and the like; and petroleum fractions such as gasoline, kerosene, light oils, and the like. Likewise, halogenated hydrocarbons such as methylene chloride, chlorobenzene, and the like may also be utilized. By "inert" is meant that the material being referred to is non-deactivating in the polymerization reaction zone under the conditions of gas phase polymerization and is non-deactivating with the catalyst in or out of the reaction zone. By "non-fimctional", it is meant that the solvents do not contain groups such as strong polar groups which can deactivate the active catalyst metal sites.

The concentration of the catalyst and/or co-catalyst that is in solution that is provided to the lean particle zone may be as high as the saturation point of the particular solvent being used. Preferably, the concentration is in the range of from about 0.01 to about 10,000 millimoles/liter. Of course, if the catalyst and/or co-catalyst is being used in its neat form, i.e., in its liquid state with no solvent, it will be comprised of essentially pure catalyst and/or co-catalyst, respectively.

The size of the droplets formed when introducing the catalyst system into the reactor is generally determined by the manner and place in which the catalyst is introduced. It is desirable to use a means of introduction which is able to provide liquid droplets in the particle lean zone having an average diameter which is in the range of from about 0.1 to about 1000 microns, preferably within a range of 0.1 to 500 microns, most preferably ranging from about 1 to 150 microns. A narrow distribution of droplet size in a lower or mid range of about 10 to about 100 can prevent the formation of large agglomerates resulting from large droplets and the formation of fines resulting from small droplets. Under many conditions, however, a wide droplet size distribution is acceptable as the smaller droplets can agglomerate to some degree with the resin in the reactor and large droplets can from larger particles of up to 0.25 which can be readily fluidized as long as the particle fraction is low enough, preferably less than 10% and more preferably less than 2% by weight of the total resin in the bed.

Establishing a Resin Particle Lean Zone. A resin particle lean zone can be established in the reactor by feeding the catalyst in any manner such that the catalyst droplets do not immediately contact a substantial portion of the resin particles of the fluidized bed. The droplets of the unsupported catalyst in liquid form are introduced without immediately contacting growing polymer particles of the bed so as to provide an average polymer particle size (APS) ranging from about 0.01 to about 0.06 inches. Generally, the particle density in the particle lean zone is at least 10 times lower than that in the fluidized bed. As disclosed in U.S. Pat. No. 5,317,036, a liquid, unsupported catalyst is typically dispersed in a solvent such as isopentane and introduced into the fluidized bed using an inert carrier gas such as nitrogen. In the time period elapsing when the liquid catalyst in droplet form leaves the nozzle and contacts the particles in the bed, new polymer particles are formed. In the present invention, the time between the droplet leaving the nozzle and its contacting the particles in the bed ranges from about 0.01 seconds to 60 seconds, preferably about 0.01 to 30 seconds, and, most preferably, is about 0.01 seconds to 5 seconds.

A particle lean zone may be a section of the reactor which normally does not contain the fluidized bed, such as the disengaging section, the gas recirculation system, or the area below the distributor plate. The particle lean zone may also be created by deflecting resin away from the catalyst spray with a stream of gas.

In a preferred embodiment of the present invention, the liquid catalyst in a carrier gas (e.g., nitrogen, argon, alkane, or mixtures thereof) is surrounded by at least one gas which serves to move or deflect resin particles of the bed out of the path of the liquid catalyst as it enters the fluidization zone and away from the area of catalyst entry, thereby providing a particle lean zone. In a particularly preferred embodiment, the liquid catalyst in the carrier gas is surrounded by at least two gases, the first gas serving primarily to deflect resin particles of the bed out of the path of the liquid catalyst and the second gas primarily prevents the injection tube or nozzle tip from getting clogged. As used in this application, when the liquid catalyst in the carrier gas is surrounded by two gases, the catalyst is considered to be shrouded. The first or particle-deflecting gas and the second or tip-cleaning gas can each be selected from the group consisting to recycle gas, monomer gas, chain transfer gas (e.g., hydrogen), inert gas or mixtures thereof. Preferably the particle-deflecting gas is all or a portion of the recycle gas and the tip-cleaning gas is all or a portion of a monmer (e.g., ethylene or propylene) employed in the process.

Liquid catalyst in a carrier gas, particle-deflecting gas, and, when employed, the tip-cleaning gas can be introduced into the reactor at the same velocities to establish a particle lean zone. However, it is preferred that they enter the fluidization zone at differing velocities. Preferably, the liquid catalyst in the carrier gas is introduced at a velocity ranging from about 50 ft/sec to about 400 ft/sec; the particle-deflecting gas is introduced at a velocity ranging from about 10 ft/sec to about 150 ft/sec, and, when employed, the tip-cleaning gas ranges in velocity from about 50 ft/sec to about 250 ft/sec. Preferably, the pressure of the particle-deflecting gas, and, when employed, the tip-cleaning gas is about 10 to about 50 psig, preferably about 20 to about 30 psig, than the pressure of the gas in the fluidization zone of the reactor. Typically, the particle-deflecting gas pressure ranges from about 10 to about 50 psig; the tip-cleaning gas pressure, when employed, ranges from about 50 to 250 psig; and the liquid catalyst/carrier gas pressure ranges from about 50 to about 250 psig. When the particle-deflecting gas is the recycle gas, it is a portion comprising about 5 to about 25 percent of the total recyle flow and is preferably removed from the discharge side of the compressor. When the tip-cleaning gas is the monomer gas, it is a portion comprising about 2 to about 40 percent of the total monomer flow. The particle-deflecting gas and the tip-cleaning gas can also optionally contain one or more antifoulants or antistatic agents known to those skilled in the art. While inert gases can be employed in the present invention as the particle-deflecting and tip-cleaning gases, they can be impractical because they require increased reactor venting, thereby decreasing efficiency of monomer usage and increasing cost.

Unsupported liquid catalyst can be introduced into the polymerization zone from the side, top, or bottom of the reactor. Side feeding the liquid catalyst is generally preferred, since it requires no or little modification of a conventional commercial reactor. When the liquid, unsupported catalyst is fed from a side location into the fluidization or polymerization zone of the reactor, it, along with the particle-deflecting gas and optional tip-cleaning gas, preferably enters the bed from a position that is about 10 percent to about 40 percent of the distance from the distributor plate to the top of the bed, most preferably about 15 percent to about 25 percent of the distance from the distributor plate to the top of the bed. When the liquid, unsupported catalyst is fed from the bottom of the reactor along with the particle-deflecting gas and optional tip-cleaning gas, it perferably enters the fluidized bed from a position that is at or near the center of the distributor plate in the bottom of the reactor to provide a particle lean zone. When the unsupported, liquid catalyst is introduced from a location in the top of the reactor, it is preferred that it enter in such a manner so as to avoid polymerization in the expanded zone of the reactor, and, therefore, is released in the reactor at the top or just immediately above the fluidized bed. This allows the catalyst droplets to additionally coat fines which can accumulate as dust above the top of the fluidized bed.

Any catalyst delivery system that is capable of atomizing the liquid catalyst into droplets of the desired size and distribution and avoids plugging of the tip or nozzle can be employed in the present invention. One embodiment of a catalyst delivery system comprises a particle-deflecting gas tube enclosing an optional tip-cleaning gas tube which in turn encloses a catalyst injection tube. The particle-deflecting gas tube has a sufficient inside diameter for the insertion or mounting of the tip-cleaning gas tube. For a commerical fluidized bed reactor, typically the particle-deflecting gas tube has an inside diameter ranging from about 2 inches to about 12 inches, preferably about 4 to about 6 inches. The optional tip-cleaning gas tube, has an outside diameter capable of fitting inside the particle-deflecting gas tube. For a conventional reactor, typically the tip-cleaning gas tube has an inside diameter ranging from about 0.5 inches to about 1.5 inches, preferably about 0.75 to about 1.25 inches.

The particle-deflecting gas tube can be flush with the inside wall of the reactor or lead edge (top surface) of the distributor plate, or, preferably, it can be extended beyond the inside wall of the reactor or lead edge of the distributor plate into the fluidization zone. Preferably the particle-deflecting gas tube is flush with the inside wall or top of the distributor plate. When employed the tip-cleaning gas tube can be positioned flush with, extended beyond, or recessed in the particle-deflecting gas tube. Preferably the tip-cleaning gas tube is flush with or recessed in the particle-deflecting gas tube. Most preferably the tip-cleaning gas tube is flush with the particle-deflecting gas tube.

The catalyst injection tube or nozzle can be housed within the particle-deflecting gas tube, but is preferably housed within the tip-cleaning gas tube which is inside the particle-deflecting gas tube. Preferably the catalyst injection tube or nozzle is tapered at its tip to a fine or knife edge to minimize surface area for injector fouling and convenient entry to the reactor vessel. The catalyst injection tube or nozzle is secured or anchored to the inner wall of the particle-deflecting gas tube or preferably to the tip-cleaning gas tube by means of one or more fins or flanges. Stainless steel injection tubing and pneumatic spray nozzles are commercially available in a wide range of internal diameters and thicknesses such that tubing or nozzle size can easily be matched the the amount of catalyst solution feed. For a commercial-size fluidized bed reactor, tubing and nozzles having about a ⅛-inch inside diameter are employed. The orifice diameter in the spray nozzle tip is in the ranged of from about 0.01 inch to about 0.25 inch, preferaably from about 0.02 inch to about 0.15 inch. The orifice diameter of the tip of the injection tube is between about 0.05 inch to about 0.25 inches, preferably between about 0.1 inch to about 0.2 inches. Suitable nozzles can be obtained from Spraying Systems Corportation (Wheation, Ill.) and can include the ⅛ JJ Series having standard and customized configurations. For a given liquid catalyst and reactor polymerization conditions the catalyst liquid feed rates can be adjusted by one skilled in the art to obtain the desired droplet size and distribution. The catalyst injection tube or nozzle can be located flush, extended, or recessed with respect to the leading tip edge of the particle-deflecting gas tube and/or optional tip-cleaning gas tube.

In the absence of the tip-cleaning gas tube, the catalyst injection tube or nozzle can be located flush, extended, or recessed with respect to the leading tip edge of the particle-deflecting gas tube. Preferably the catalyst injection tube or nozzle is located flush or extended with respect to the leading tip edge of the particle-deflecting gas tube in the absence of the tip-cleaning gas tube. Most preferably it is located flush in the particle-deflecting gas tube. When a tip-cleaning gas tube is employed in conjunction with the particle-deflecting gas tube, the catalyst injection tube or nozzle is extended beyond the leading edge of the tip-cleaning gas tube or flush with the leading edge to the tip-cleaning gas tube. Preferably, the catalyst injection tube or nozzle is extended 2 to 4 inches beyond the leading edge of the tip-cleaning gas tube, but recessed with respect to the particle-deflecting gas tube.

All references cited herein are incorporated by reference.

Whereas the scope of the invention is set forth in the appended claims, the following specific examples illustrate certain aspects of the present invention. The examples are set forth for illustration only and are not to be construed as limitations on the invention, except as set forth in the claims. All parts and percentages are by weight unless otherwise specfied.

EXAMPLES

Preparation of Liquid Metallocene Catalyst.

Indene (available from Nippon Steel) and $Zr(NEt_2)_4$ (available from Boulder Scientific) were reacted in stoichiometric amounts to form $IndZr(NEt_2)_3$. Gaseous carbon dioxide was bubbled through a 0.05 Molar solution of $IndZr(NEt_2)_3$ for fifteen minutes while being cooled with an ice bath. The solution was then sparged for fifteen minutes with nitrogen to remove excess carbon dioxide.

Polymerization in Pilot-scale Fluidized Bed Reactor Using Liquid Metallocene Catalyst.

In Examples 1 to 5, polymerizations were conducted in pilot-scale fluidized-bed reactors of 14- or 18-inch nominal diameter having a cylindrical section containing the fluidized-bed, an expanded section for disengagement of entrained resin, a gas compressor, a heat exchanger used for control of the resin temperature, and a product discharge system. The flowrate of reactant and inert gas through the reactor system was adjusted by a ball valve on the recycle line to provide a superficial gas velocity in the polymerization zone of 1.5 to 1.8 ft/sec. The gas was circulated through the reactor at a rate between 8,000 and 13,000 lbs/hr. Resin was produced at a rate between 30 and 40 lbs/hr to provide a resin residence time of 3 to 4 hours.

The liquid catalyst prepared above was metered to the reactor with a piston pump. Alumoxane cocatalyst was pressurized under 500-psi nitrogen and metered with a motor valve. The catalyst and cocatalyst were contacted in standard ⅛ or ¼" tubing tees and allowed to mix for several minutes before being diluted with isopentane. Mixing times varied between a few minutes and an hour, depending on the activation requirements of the catalyst. When an injection tube was used, the catalyst solution was mixed with nitrogen atomization gas just upstream of the reactor. When nozzles were used, the catalyst/cocatalyst mixture was delivered to the nozzle separately from the nitrogen. Catalyst concentrations and feed rates, and cocatalyst feed rates are listed in Table I of the examples. The alumoxane was supplied by Akzo-Nobel and is designated as MMAO type 3A. This was mixed with an equal weight of purified isopentane to provide a 4.4 wt % Al solution, for convenience in handling.

Reactor startup was accomplished by charging a seed bed and drying to less than 5 ppm water. The reactor was filled with monomer and inert gas to the desired levels and heated to the desired temperature. A nitrogen purge flow was maintained on the nozzles and/or injection tubes during this time. Cocatalyst flow was initiated, and once flowrate control was established, the catalyst feed was begun. Polymerization initiated immediately after the catalyst/cocatalyst mixture reached the reactor.

The average particle size was determined by a sieve analysis using ASTM D-1921 Method A.

Liquid catalyst was sprayed into the pilot-scale reactor with three different injectors: (1) a commercial nozzle adapted from reactor use, (2) the same nozzle with an elongated air cap, and (3) a tapered injection tube.

Figure 1:
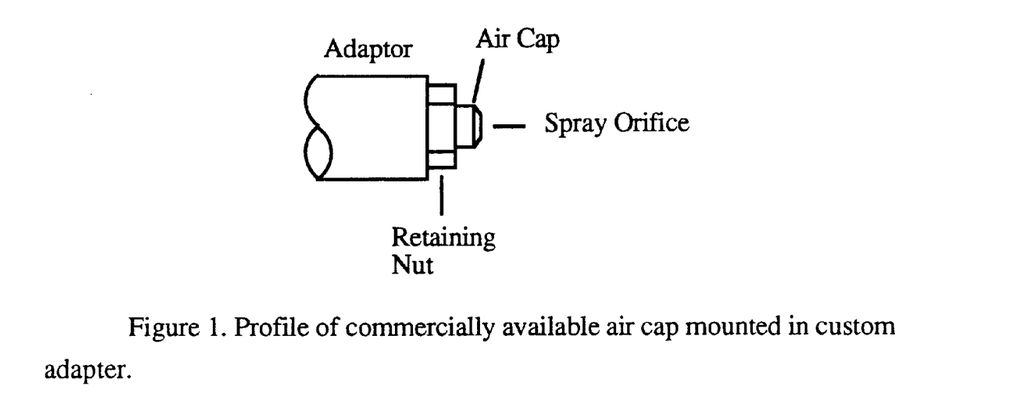
FIGS. 1–4 depict injection tube and nozzle configurations employed in the examples, which tubes and nozzles used to spray the liquid catalyst into a particle lean zone in the fluidized bed of the reactor.
Figures 2, 3:
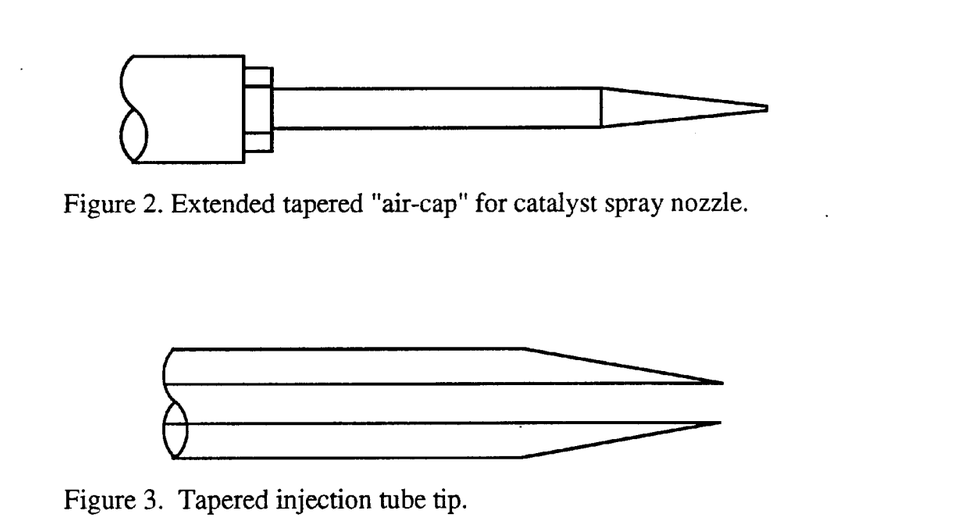

The commercial spray nozzle (1) consisted of a body, a liquid cap, and a tapered spraying tip. The liquid cap was purchased from Spraying Systems Co (⅛ JJ series #PFJ1650). Liquid catalyst along with nitrogen for atomization was fed through coaxial tubing to the body of the nozzle, which housed the liquid cap. The body was ⅝ inches in diameter and 1.125 inches long. The spray was formed at the liquid cap and fed through the air cap to the reactor. The air cap was either purchased from Spraying Systems (#PAJ67147) as depicted in FIG. 1, or was machine in-house to an elongated tapered air cap (2) as depicted in FIG. 2. The nozzle tip was 1.5 inches long and was tapered over the last 0.5 inches to reduce the accumulation of resin near the spray orifice. The orifice diameter was 0.04 inches. The air cap was held onto the reactor with a retaining nut (Spraying Systems CP12582). The third type of injector, was a 1/8 inch-OD×0.055-inch-ID stainless steel tube which was tapered over the last 1/2 inch to produc a sharp edge. This design produced in-house is depicted in FIG. 3.

Figure 4:
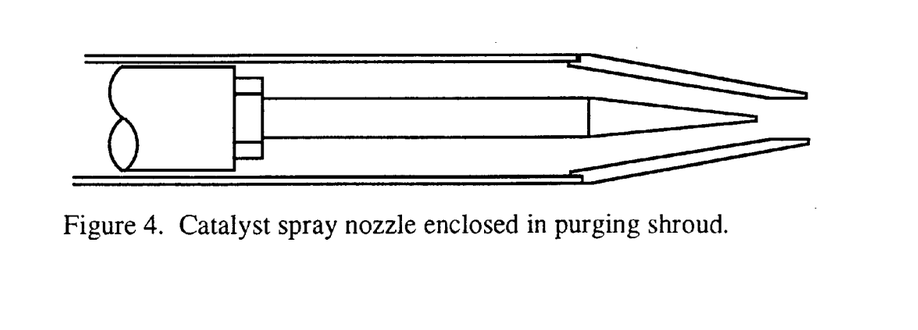

In examples 2 and 4, the spray nozzle illustrated in FIG. 2 was enclosed in a shroud to avoid polymerization near the nozzle orifice, as shown in FIG. 4. The shroud was made from 0.75 inch OD stainless steel tubing and was capped at the end with a machined tapered tip. The tip-cleaning gas was fed from behind the spray nozzle and passed around the 5/8 inch adapter piece past the tip of the nozzle.

For Examples 1 and 5, a commercial Spraying Systems Co. 1/8 JJ nozzle was used with a J-1650 liquid cap and a PAJ67147 air cap. The nozzle body was modified in-house to allow coaxial introduction of catalyst. For Examples 2 and 4, a customized air cap nozzle, 1.5 inches long with a tapered tip was used. For these examples, the nozzles were located within a 0.75-inch tip-cleaning gas tube. For Example 3, a tapered 1/8-inch injection tube was used.

In Example 1 (Comparative) (using a commercial spray nozzle), catalyst was fed through a spray nozzle at the side of the reactor, one foot above the distributor plate without providing a particle lean zone. The average particle size increased from 0.016 to 0.0511 inches soon after the reaction began, indicating that most of the new particles were agglomerating with the particles in the reactor.

In Example 5 (employing a commercial spray nozzle), catalyst was sprayed at the top of the fluidized-bed into the expanded secton to produce small particles.

In Example 4, catalyst was fed in a particle deflecing gas composed of recycle gas (426 lbs/hr) from a standpipe in the center of the distributor plate (FIG. 4). A stable APS of 0.04 inches was obtained.

In Examples 2 (a tapered spray nozzle with a $N_2$ shroud) and 3 (an injection tube in a particle deflecting gas in the absence of a shroud), catalyst was fed surrounded by a particle deflecting gas of recycle gas into the side of the reactor about 1 foot above the plate in the absence of a tip-cleaning gas. This provided stable APS in the 0.025 to 0.028 inch range.

By feeding the catalyst in the stream of recycle gas, as done in Examples 2, 3, and 4, a particle-lean zone is provided in the jet or the resulting bubbles, so that the droplets can polymerize without adhering to the resin in the bed.

TABLE I

| | Ex. 1 | Ex. 2 | Ex. 3 | Ex. 4 | Ex. 5 |
|---|---|---|---|---|---|
| Catalyst Feeding Location | Side of reactor without jet gas | Side of reactor with recycle gas jet | Side of reactor with recycle gas jet | Center of distributor plate with recycle gas jet | Top of fluidized bed |
| Catalyst Molarity | 0.025 | 0.05 | 0.05 | 0.05 | 0.025 |
| Catalyst Feedrate (cc/hr) | 10 | 10 | 5 | 12 | 5 |
| MMAO feedrate (cc/hr) | 100 | 120 | 80 | 180 | 100 |
| iC5 feedrate (lbs/hr) | 1.5 | 0 | 0 | 0 | 1.5 |
| N2 feedrate (lbs/hr) | 7 | 7.5 | 7 | 4 | 10 |
| Temperature (° C.) | 86 | 80 | 80 | 80 | 80 |
| Pressure (psig) | 350 | 350 | 367 | 365 | 350 |
| Ethylene pressure (psia) | 200 | 200 | 220 | 200 | 220 |
| C6/C2 (molar ratio) | 0.01 to 0.012 | 0.012 | 0.026 | 0.02 | 0.003 |
| Shroud N2 rate (lbs/hr)* | NA | 10 | NA | 8 | NA |
| Recycle jet rate (lbs/hr)† | NA | 1512 | 1600 | 426 | NA |
| Particle size | Increased from 0.016 to 0.0511 | Stable at 0.028" | Stable at 0.025" | Stable at 0.04" | 0.008" spherical particles recovered from disengaging section |

*Used as a tip cleaning gas.
†Used as a particle deflecting gas.

Polymerizations in a Commercial-scale Reactor with Solution Metallocene Catalyst The indenyl zirconium tris-diethyl carbamate catalyst was used to polymerize a ethylene-hexene copolymer (density 0.922, melt index 3) in a commercial-scale fluidized bed reactor. The reactor was nominally 8 feet in diameter and was operated with a bed height of 38 to 42 feet, and a superficial gas velocity of approximately 2 ft/sec. Total reactor pressure was 270 psig. A seed bed was charged to the reactor and it was dried to 50 ppm water. It was pressurized to 100 psig of nitrogen and then 80 lbs/hr of 10% TEAL in isopentane were fed to the reactor over two hours and allowed to circulate for 1 hour. The hexene-ethylene ratio was established at 0.028 and the temperature was adjusted. Atmer-163, a chemical marketed by ICI, was added as necessary to the reactor to control the buildup of electrostatic charge.

Catalyst was mixed with MMAO 3A as received at 7.38 wt % Al. Additional dilution was performed by adding isopentane to the mixture.

This liquid catalyst was introduced to the reactor with a 1/4" OD stainless-steel injection tube of 0.18 inch ID. For Examples 8 and 9, a 3-inch length of tubing with a smaller ID was welded onto the end of the injection tube. The tube was located within a particle deflecting gas tube in Examples 8 and 9. For Examples 6,7, and 8, the tip-cleaning gas tube extended 23 inches into the reactor at an elevation 6 inches above the distributor plate. For Example 9, the tip-cleaning gas tube extended 32 inches into the reactor at 8 feet above the plate. The injection tube was centered in the particle deflecting gas tube with tapered fins, and the tip of the injection tube extended 2 inches into the reactor beyond the end of the tip-cleaning gas tube. The ends of the injection tubes were tapered, to avoid accumulation of catalyst solution. The tip-cleaning gas tube was also tapered over the last 6 inches. A stream of ethylene was fed through the annular space between the tip-cleaning gas tube and the catalyst injection tube. Example 8 demonstrated that stable particle size can be achieved with a combination of ethylene flowrate through the tip-cleaning gas tube, and with a high feed rate of nitrogen through the injection tube.

Table III illustrates of the present invention in polymerization processes that produce different polymers under differing reaction conditions.

What is claimed is:

1. A process for making a polymer resin comprising:
    introducing a monomer into the polymerization zone of a gas phase reactor; and
    introducing a liquid polymerization catalyst to a resin particle lean zone within the gas phase reactor.
2. A process according to claim 1 wherein the catalyst is a Ziegler-Natta in slurry.
3. A process according to claim 1 wherein the catalyst is in solution or suspension.
4. A process according to claim 3 wherein the catalyst is a metallocene.

TABLE II

|  | Ex. 6 | Ex. 7 | Ex. 8 | Ex. 9 |
|---|---|---|---|---|
| Ethylene flow (lbs/hr)** | 1000 | 2000 | 2000 | 500 |
| Ethylene velocity (ft/sec) | 67 | 133 | 131 | 275 |
| Ethylene temperature (° C.) | 15 | 45 | 85 | 15 |
| Shroud ID (inches) | 0.847 | 0.847 | 0.847 | 0.375 |
| Shroud OD (inches) | 1.935 | 1.935 | 1.935 | 1 |
| Shroud length (inches) | 23 | 23 | 23 | 32 |
| N2 flow (lbs/hr)†† | 50 | 80 | 110 | 100 |
| N2 velocity (ft/sec) | 67 | 108 | 328 | 311 |
| Injector ID (inches) | 0.18 | 0.18 | 0.12 | 0.1175 |
| Injector OD (inches) | 0.25 | 0.25 | 0.25 | 0.25 |
| MMAO (lbs/hr) | 14 to 28 | 15 to 18 | 6 to 10 | 9 |
| Catalyst (lbs/hr) | 2 to 4 | 0.5 to 1 | 1 to 1.7 | 1 |
| Al:Zr (molar) | 350 | 1000 | 350 | 350 |
| Isopentane (lbs/hr) | 0 | 9 to 24 | 8 | 8 |
| Temperature (° C.) | 80 | 80 | 75 | 75 |
| C2 Partial Pressure (psia) | 185 to 200 | 170 to 180 | 170 to 180 | 170 to 180 |
| Elevation above distributor (ft) | 0.5 | 0.5 | 0.5 | 8 |
| Particle size (inches) | Increased rapidly to 0.078 | Increased rapidly to 0.066 | Stable at 0.032" | Grew rapidiy Steady state not reached |

**Used as a carrier gas.
††Used as a particle deflecting gas and as a tip cleaning gas.

TABLE III

|  | Ex. 10 | Ex. 11 | Ex. 12 | Ex. 13 | Ex. 14 |
|---|---|---|---|---|---|
| Poymer | PE | PP | EPR | BR | Polylsoprene |
| Liquid Catalyst | Zr metallocene | Ti metallocene | $V(AcAc)_3$ | Nd Versatate | Nd neodeconate |
| Cocatalyst | MAO | MMAO | DEAC | TIBA | TEAL |
| Promoter | — | — | ETCA | DIBAH | MAO |
| Inert Particulate Material | — | — | Carbon black | Carbon black | Carbon black |
| Reactor Temperature, ° C. | 75 | 80 | 40 | 50 | 35 |
| Reactor pressure, psig. | 300 | 450 | 400 | 300 | 300 |
| Gas Velocity, ft/sec. | 2.0 | 2.0 | 1.7 | 1.7 | 1.7 |
| Space/Time/Yield, lb/hr/ft³ | 8 | 8 | 4 | 4 | 4 |
| Gas composition |  |  |  |  |  |
| Partial Pressure |  |  |  |  |  |
| $C_2H_4$ | 250 | — | 100 | — | — |
| $C_3H_6$ | — | 375 | 250 | — | — |
| $C_4H_6$ | — | — | — | — | — |
| $C_5H_8$ | — | — | — | 40 | 20 |
| $H_2/C_2$ | 0.01 | — | 0.025 | — | — |
| $H_2/C_3$ | — | 0.01 | — | — | — |
| $C_3/C_2$ | — | — | 2.5 | — | — |
| Particle Deflecting Gas | Recycle Gas | Recycle Gas | Recycle Gas | Recycle Gas | Recycle Gas |
| Tip Cleaning Gas | Ethylene | Ethylene | Ethylene | Recycle Gas | Recycle Gas |
| Injection Means* | 2 | 2 | 2 | 2 | 2 |

*1 = Extended tapered air-cap spray nozzle (FIG. 2); 2 = Tapered injection tube (FIG. 3); 3 = Catalyst spray nozzle in purging shroud.

5. A process according to claim 4 wherein the catalyst is introduced to the reactor with an inert carrier gas.

6. A process according to claim 5 wherein the particle lean zone is created by deflecting the resin with a stream of gas away from the catalyst as it is introduced into the reactor.

7. A process according to claim 6 wherein the catalyst is introduced to the reactor with a nozzle tube having a particle-deflecting gas tube enclosing a tip-cleaning gas tube which in turn encloses a catalyst injection tube.

8. A process according to claim 6 wherein the nozzle is a spray nozzle.

9. A process according to claim 1 wherein propylene homopolymer or copolymer is the polymer.

10. A process according to claim 1 wherein the process is carried out in multiple reactors.

11. A process according to claim 10 wherein the polymer is a propylene copolymer.

12. A process according to claim 1 operating in condensed mode.

13. A process according to claim 12 wherein the reactor has a fluidized bed of growing polymer particles.

14. A process according to claim 13 wherein the particle lean zone is created by deflecting the resin with a stream of gas away from the catalyst as it is introduced into the reactor.

15. A process according to claim 14 wherein the catalyst is introduced into the reactor with a spray nozzle.

16. A process according to claim 15 wherein the spray nozzle is a tube enclosed within another tube through which the particle-deflecting gas is fed to the reactor.

* * * * *